C. HOLWEG.
PAPER BAG MACHINE.
APPLICATION FILED MAR. 1, 1909.
977,801.
Patented Dec. 6, 1910.
5 SHEETS—SHEET 3.
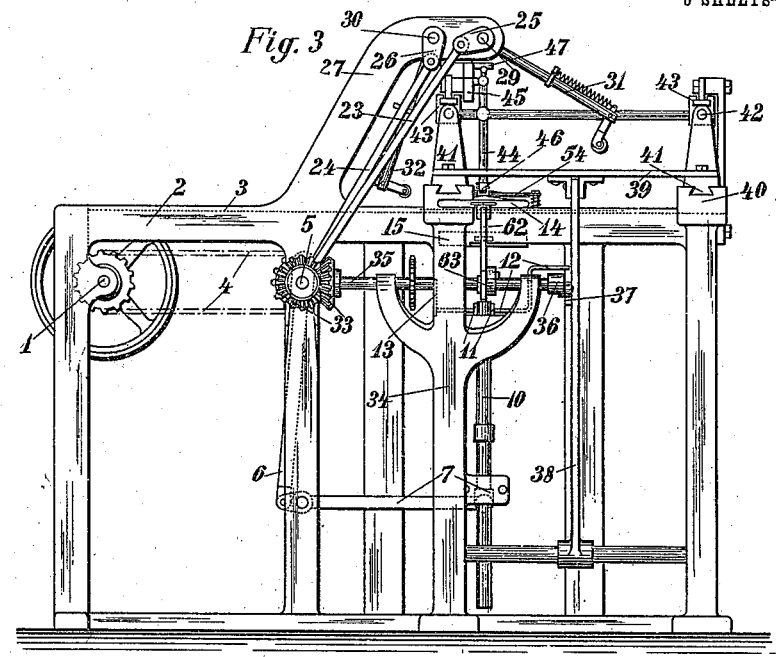
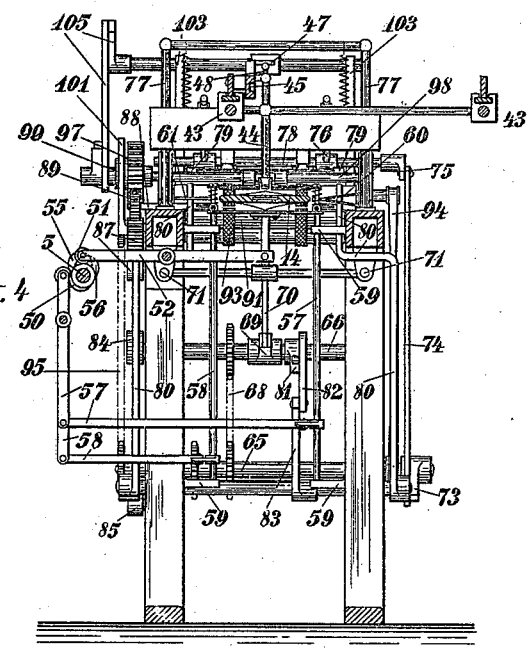
Witnesses
Kenneth Romaines
E. Beckers-Scheins
Inventor
Carl Holweg
by Paul E. Schilling
Attorney C. HOLWEG.
PAPER BAG MACHINE.
APPLICATION FILED MAR. 1, 1909.
977,801.
Patented Dec. 6, 1910.
6 SHEETS—SHEET 4.
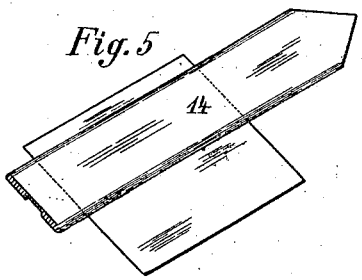
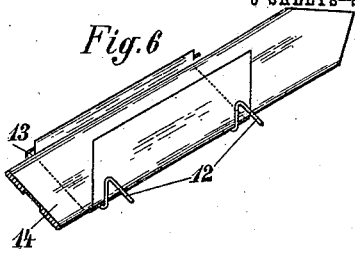
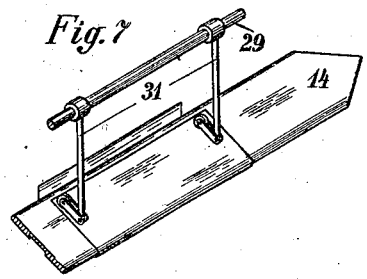
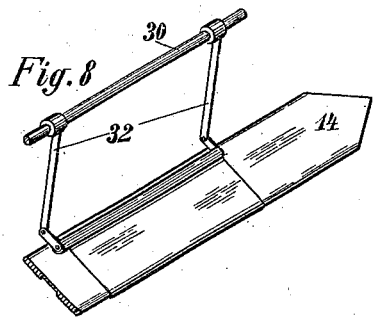
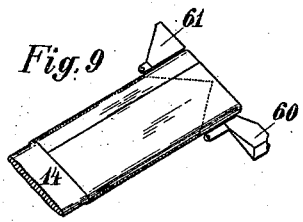
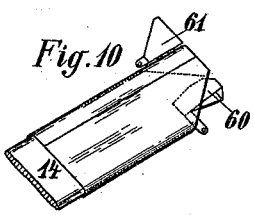
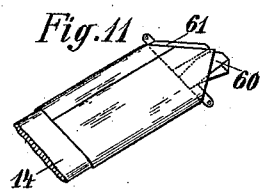
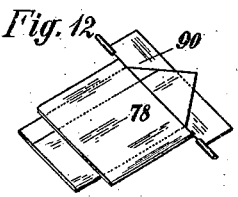
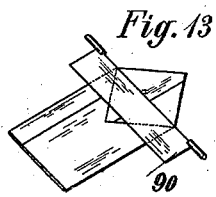
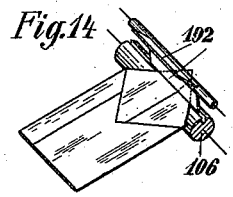
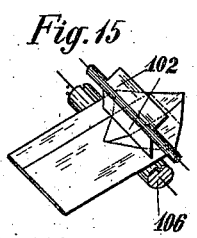
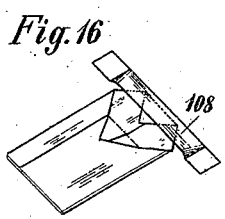
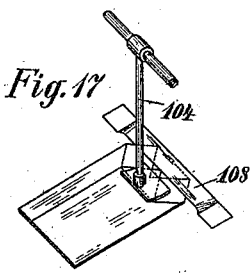
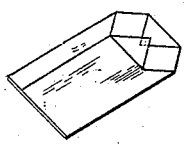
Witnesses
Kenneth Romanes
E. Beckers-Schein.
Inventor
Carl Holweg
by
Attorney C. HOLWEG.
PAPER BAG MACHINE.
APPLICATION FILED MAR. 1, 1909.
977,801.
Patented Dec. 6, 1910.
5 SHEETS—SHEET 5.
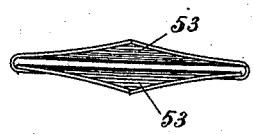
Fig. 20
Fig. 19
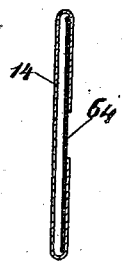
Fig. 22
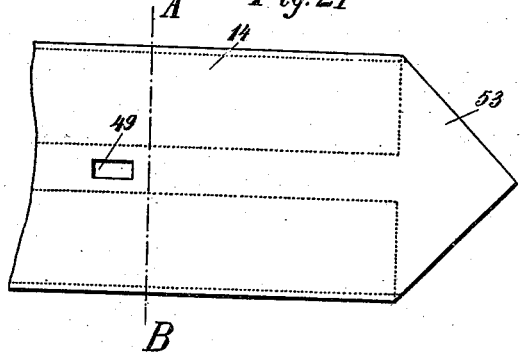
Fig. 21
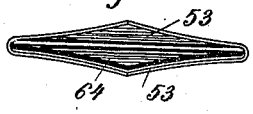
Fig. 24
Fig. 23
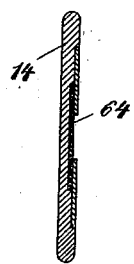
Fig. 26
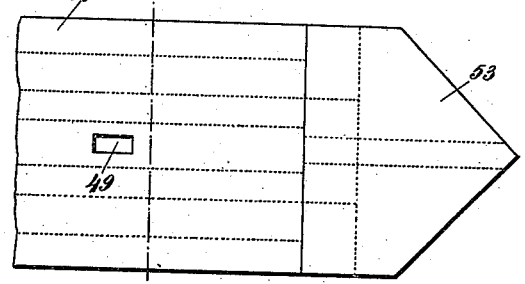
Fig. 25
Witnesses
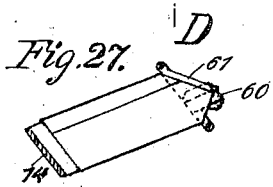
Fig. 27.
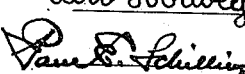
Inventor
Carl Holweg
by his Attorney.

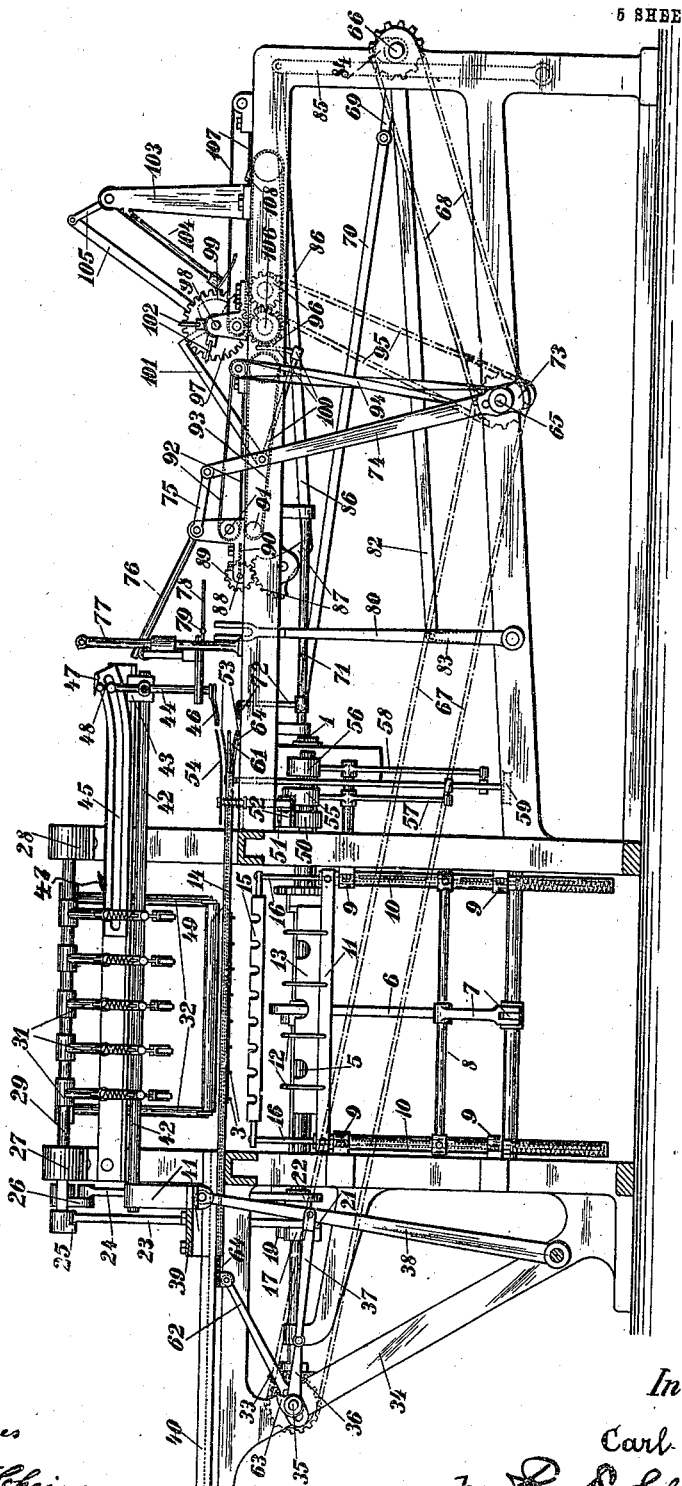

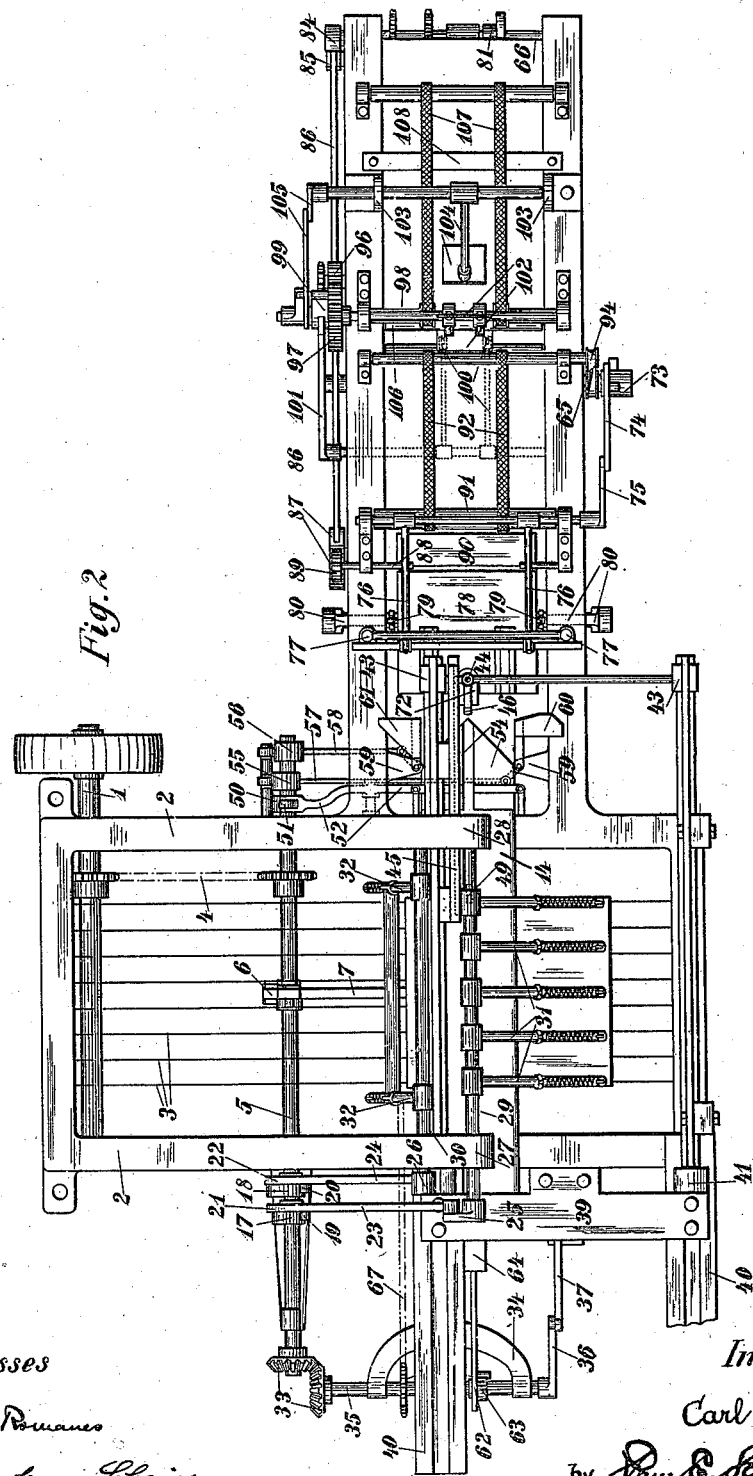

UNITED STATES PATENT OFFICE.

CARL HOLWEG, OF STRASBURG, GERMANY.

PAPER-BAG MACHINE.

977,801.  Specification of Letters Patent.  Patented Dec. 6, 1910.

Application filed March 1, 1909. Serial No. 480,652.

*To all whom it may concern:*

Be it known that I, CARL HOLWEG, a subject of the German Emperor, residing at Strasburg, Alsace, German Empire, have invented certain new and useful Improvements in Paper-Bag Machines, of which the following is a specification.

My invention relates to an improved machine for the manufacture of so-called satchel or flat bottomed paper bags.

According to my invention the sheet of paper, ready cut and pasted, is closed over a former so as to constitute a tube and is then fed forward to the head of the said former.

One form of construction of my new machine is illustrated in the accompanying drawings.

Figure 1 is an elevation, partly in section, and Fig. 2 is a plan of the machine, while Fig. 3 is an end view, seen from the right hand of Fig. 1. Fig. 4 is a cross section. Figs. 5–17 are perspective views illustrating the bag in its various stages of manufacture. Fig. 18 shows the finished bag. Figs. 19, 20, 21, 22, are detail views illustrating in longitudinal section, end elevation, plan and cross section respectively a former having an upper stationary tongue and a lower movable one, the cross section being taken on the line A—B of Fig. 21, Figs. 23, 24, 25, 26 are similar views of another construction of former, having a bottom stationary tongue below the movable one, the cross section being taken on the line C—D of Fig. 25. Fig. 27 is a perspective view of a slightly modified arrangement of crusher.

The machine is driven off the main shaft 1, which is mounted in a lateral extension 2 of the framing. This extension 2 also carries the strings 3 for guiding the sheets of paper, cut and pasted, all in well-known manner (Figs. 2 and 3). By means of the sprocket gearing 4 the motion of the shaft 1 is transmitted to a second shaft 5, which operates a lever system 6, 7, fulcrumed on the extension 2. The levers 6, 7 actuate the vertically reciprocating tubes 10, connected by cross rods 8 and guided by eyes 9 projecting from the framing. These tubes 10 carry at their top a double cross bar 11, presenting fingers 12 and a rail 13, whereby the edges of the sheet, pressed against the superposed former 14, are turned up. The sheet is pressed against the former by a plate 15, grooved to correspond with the strings 3 and actuated by spring-controlled rods 16 guided by the tubes 10. To fold down the upturned edges of the sheet eccentrics 17 18 are mounted on the shaft 5. These eccentrics actuate rods 23, 24 provided with pins 19, 20 and slots 21, 22, which latter receive the shaft 5. The upper ends of the rods 23, 24 are pivoted to cranks 25, 26 secured to the shafts 29, 30 respectively, which latter are mounted in arms 27, 28. In this manner the roller carriers 31, 32, secured to the shafts 29, 30, can be vibrated.

The motion of the shaft 5 is transmitted by bevel gears 33 to another shaft 35 mounted in the support 34 (Figs. 1, 2 and 3). The other end of this shaft is provided with a crank 36, connected by a link 37 with an oscillating bar 38, fulcrumed to the framing. The top of this bar 38 is pivoted to a cross bar 39 of a slide 41 moving in dovetail grooves 40 in the top of the machine framing. With the horizontal rods 42 of the slide 41 there travel the devices 43 carrying a gripper 44, whose reciprocatory motion is limited by a slotted rail 45 secured to the machine framing (Fig. 1). The jaws 46 of the gripper 44 are opened and closed in their end positions by projections 47 on the rails 45 against which the inner gripper rod 48 strikes at a suitable moment. To enable the paper tube on the former 14 to be the better grasped by the gripper 44, a groove or hole 49 is provided in the top part of the former 14. At the other end of the shaft 5 there is mounted a cam 50 on which runs the roller 51 of a double armed lever 52, pivoted to the frame extension 2. This lever 52 actuates a plate 54, which is resiliently guided above two tongues 53 and holds the paper tube (Figs. 2 and 3). At the same end of the shaft 5 there are also two cams 55, 56 which actuate a lever system 57, 58 (Fig. 4), which again oscillates two crushers 60, 61 pivoted to lugs 59 (Fig. 2). The one crusher 60 is preferably sheath-shaped, while the other crusher 61 has the form of a blade. These crushers may be of such size as to slightly overlap when operated, in which instance crusher 61 will enter crusher 60, as shown in Fig. 27. This arrangement is not to be considered as strictly essential, however, since said crushers may be, and in most cases are, made too small to actually overlap, as shown in Figs. 10 and 11. Between the two stationary tongues 53' there is located a movable tongue 64 (Figs. 23–26). The tongues each present a rectangular point, and the movable tongue 64 is pivoted to a crank rod 62 (Fig. 2) actuated by a cam 63 on the shaft 35, whereby the tongue 64 can be slid out and the paper tube, presenting a bottom pocket, caused to protrude. In the construction shown in Figs. 19–22 a hollow former 14 is depicted, and the lower stationary tongue 53 is dispensed with, the movable tongue 64 being made of such width as to extend across the former 14 (Fig. 22).

The motion of the shaft 35 is transmitted to the shaft 65 and thence to the shaft 66 by chain gearing 67, 68 (Fig. 1). On the shaft 66 there is mounted a crank 69 which is jointed to a rod 70. This rod 70 reciprocates a second gripper 72, which is carried by a rod 71 secured to the framing. The shaft 65 has mounted on it a cam 73 which actuates crank mechanism 74, 75, 76, whereby the spring actuated pressing-plate 78, carried by rods 77 on the framing, is depressed. When in its lowest position the plate 78 at a suitable moment is advanced a definite distance by its lateral pins 79 being received by the two forked rods 80 pivoted to the framing and oscillated by crank mechanism 82, 83 actuated by a cam 81 on the shaft 66 (Figs. 1 and 2). The shaft 66 also has mounted on it a cam 84 which operates lever mechanism 85, 86 which is pivoted to the back framing, whereby a mutilated gear (toothed segment) is rotated. This gear 87 meshes with a gear 89 mounted on the shaft 88 and rotates a spreader 90, secured to the said shaft 88, through 180 degrees. In this manner the one flap of the bag bottom is turned over and spread out flat and the folding operation thus facilitated.

For the purpose of feeding the thus partly formed bag forward, two endless tapes 92, 93 are furnished, passing over rollers 91. The one tape is driven off the shaft 65 by means of a cross belt 94, while the other is driven solely by friction. The spur gearing 96, likewise driven off the shaft 65, transmits motion by means of a gear 97 to the shaft 98. On this shaft there is mounted a cam 99, which by means of bent rods 101 actuates an adjusting device 100 for the bag, fulcrumed on the framing. The shaft 98 has also secured to it two preliminary folding blades 102, located at a certain angle to each other, and which by making plicated lines define the corners of the bag bottom to be turned over. Pivoted to the support 103 is an oscillating folder 104, which is actuated off the shaft 98 by means of a crank mechanism 105. At the back end of the framing there is mounted a second tape conveyer 107, driven by the spur gearing 96 whose one gear is mounted on a grooved shaft 106. In the province of the conveyer 107 there is provided a cross bar 108 located at some distance from the sliding surface, and which turns down the one corner of the bag bottom, while the other is turned down by the folder 104.

The machine works in the following manner:—The sheet of paper is first conveyed below the former 14 by the device 3, and is pressed against the bottom of the plate 15 owing to the latter ascending (Fig. 5). Hereupon the ascent of the double cross bar 11 with fingers 12 and rail 13 will turn up the unequally projecting edges of the sheet (Fig. 6). Owing to the successive operation of the roller carriers 31, 32, first the broad edge (Fig. 7) and then the narrow edge (Fig. 8) of the sheet will be flattened down. After the paper has been given this tubular shape, the gripper 44, through the operation of the parts 36—43, and guided by the rail 45, will advance toward the left. At the commencement of this motion the rod 48 of the said gripper will slide from below the projection 47, which results in the jaws 46 being closed. Shortly before the gripper arrives above the hole 49 in the top of the former 14 the rod 48 will strike the second projection 47 furnished on the rail 45 and the jaws 46 will open. On the gripper 44 now commencing its return travel the rod 48 slides from below the second projection 47 and the jaws 46 will close again and will seize the paper tube. The tube will thus be drawn up to the splayed tongues 53, where, on contact of the rod 48 with the first projection 47 again, it will be released (Fig. 9). Hereupon the plate 54 will descend, owing to the operation of the cam 50 and lever 52, and will press or clip the paper tube against the former 14. The two crushers 60, 61 actuated by the levers 57, 58, and shaft 5 will now operate and crush or beat the end of the paper tube into the mouth constituted by the tongues 53 (Figs. 10, 11). After these crushers have again swung out and the plate 54 has been lifted by spring action, the movable tongue 64 will advance, whereby the paper tube will be brought somewhat beyond the stationary tongues. On return of the movable tongue 64 the gripper 72 actuated by the levers 69, 70 and shaft 66 will seize the projecting end of the bag and will draw it below the pressing plate 78. This motion of the paper tube continues until the latter butts with its mouth against the back of the spreader 90, which can be turned through 180 degrees, whereupon the plate 78, which registers with the ends of the diagonal lines of the bag bottom, descends under the influence of the crank mechanism 74, 75, 76, and the paper tube will be pressed upon the support (Fig. 12). The spreader 90 now turns through 180 degrees, under the action of the gears 87 rotated by the shaft 66, and will turn over and spread out the bottom flap, precisely laying down the bottom fold (Fig. 13). The pins 79 of the plate 78 now lie in the forks 80, whereby the plate will be caused to advance with the paper tube until the latter has been seized by the tapes 92, 93, whereupon the plate 78 will be returned and its ascent caused in the like but reverse manner. After the paper tube has been adjusted by the fingers 100, actuated by the shaft 99 and bent rods 101 the tape conveyer 92, 93 will bring the tube below the preliminary plicator device (consisting of the grooved shaft 106 and the two blades 102). This device makes the plicated lines for the purpose of facilitating folding of the corners of the bag bottom (Figs. 14 and 15). After the paste has been applied in suitable manner the bag is fed along by the second conveyer 107, and the first bag corner is folded down by the cross bar 108 (Fig. 16) and the other corner then folded down by the vibrating folder 104 (Fig. 17), whereupon the finished bag is delivered from the machine.

Having thus described my invention, I declare that what I claim as new and desire to secure by Letters Patent is:—

1. In a paper bag making machine, in combination, a pointed former, means for pressing the sheet against the bottom of the former, vertically reciprocating means located below the former for turning up the edges of the sheet, vibrating means for turning down said edges in succession upon the top of the former, means for drawing the so formed paper tube up to the point of said former, two crushers for beating in the edges of the projecting tube end, means for further advancing the tube, vertically and horizontally reciprocating means for holding the latter, a rotatable spreader for turning back the upper flap of the bag bottom, means for further advancing the bag, a two-bladed plicator for defining the bag bottom corners, and means for folding down said corners, substantially as described.

2. In a paper bag making machine, in combination, a pointed former presenting superposed projecting tongues, means for pressing the sheet against the bottom of the former, vertically reciprocating means located below the former for turning up the edges of the sheet, vibrating means for turning down the edges in succession upon the top of the former, means for drawing the so formed paper tube up to the said tongues, two pivotal crushers, adapted to enter between the tongues and beat in the edges of the projecting tube end, means for further advancing the tube, vertically and horizontally reciprocating means for holding the latter, a rotatable spreader for turning back the upper flap of the bag bottom, means for further advancing the bag, a two bladed plicator for defining the bag bottom corners, and means for folding down said corners, substantially as described.

3. In a paper bag making machine, in combination, a pointed former presenting projecting superposed tongues, means for pressing the sheet against the bottom of the former, vertically reciprocating means located below the former for turning up the edges of the sheet, vibrating means for turning down the edges in succession upon the top of the former, means for drawing the so formed paper tube up to said tongues, a vertically reciprocating spring actuated plate adapted to descend upon the upper tongue and clip the tube, two pivotal crushers, adapted to enter between the tongues and beat in the edges of the projecting tube end, means for further advancing the tube, vertically and horizontally reciprocating means for holding the latter, a rotatable folder for turning back the upper flap of the bag bottom, means for further advancing the bag, a two-bladed plicator for defining the bag bottom, and means for folding down said corners, substantially as described.

4. In a paper bag making machine, in combination, a pointed former presenting projecting superposed tongues, means for pressing the sheet against the bottom of the former, vertically reciprocating means located below the former for turning up the edges of the sheet, vibrating means for turning down the edges in succession upon the top of the former, means for drawing the so formed paper tube up to said tongues, two pivotal crushers, adapted to enter between the tongues and beat in the edges of the projecting tube end, means for further advancing the tube, a vertically and horizontally reciprocating plate for holding the latter, means for sliding the lower tongue with the tube, a gripper adapted to seize the tube from the advanced tongue, a rotatable spreader for turning back the upper flap of the bag bottom, means for further advancing the bag, a two-bladed plicator for defining the bag bottom corners, and means for folding down said corners, substantially as described.

5. In a paper bag making machine, in combination, a pointed former, means for pressing the sheet against the bottom of the former, vertically reciprocating means located below the former for turning up the edges of the sheet, vibrating means for turning down said edges in succession upon the top of the former, a sliding reciprocating gripper for drawing the so formed paper tube up to the point of said former, two crushers for beating in the edges of the projecting tube end, means for further advancing the tube, a vertically and horizontally reciprocating plate for holding the latter, a rotatable flat spreader for turning back the upper flap of the bag bottom, means for further advancing the bag, a two-bladed plicator for defining the bag bottom corners, and means for folding down said corners, substantially as described.

6. In a paper bag making machine, in combination, a pointed former, means for pressing the sheet against the bottom of the former, vertically reciprocating means located below the former for turning up the edges of the sheet, vibrating means for folding down said edges in succession upon the top of the former, a sliding reciprocating gripper for drawing the so formed paper tube up to the point of said former, two crushers for beating in the edges of the projecting tube end, means for further advancing the tube, a vertically and horizontally reciprocating plate for holding the latter, a rotatable flat spreader for turning back the upper flap of the bag bottom, a tape conveyer for further advancing the bag, vibrating fingers for adjusting the bag, a two-bladed plicator for defining the bag bottom corners, and means for folding down said corners, substantially as described.

7. In a paper bag making machine, in combination, a pointed former, means for pressing the sheet against the bottom of the former, vertically reciprocating means located below the former for turning up the edges of the sheet, vibrating means for turning down said edges in succession upon the top of the former, a sliding reciprocating gripper for drawing the so formed paper tube up to the point of said former, two crushers for beating in the edges of the projecting tube end, means for further advancing the tube, vertically and horizontally reciprocating means for holding the latter, a rotatable spreader for turning back the upper flap of the bag bottom, means for further advancing the bag, a grooved shaft, a rotatable plicator presenting two blades located at an angle and adapted in succession to press the material of the bag corners into the groove of said shaft, and thus define the bag bottom corners, a flat folder for turning over the one corner of the bag bottom, and a vibrating folder for turning over the other corner, substantially as described.

In testimony whereof I affix my signature in presence of two witnesses.

CARL HOLWEG.

Witnesses:
 JOSEPH ROHMER,
 W. CH. C. HUECKLEN.